(12) United States Patent
Kwon et al.

(10) Patent No.: US 7,342,854 B2
(45) Date of Patent: Mar. 11, 2008

(54) APPARATUS FOR GENERATING TRACKING ERROR SIGNALS

(75) Inventors: Dae-Hoon Kwon, Gyunggi-do (KR); Gae-ok Cho, Gyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 27 days.

(21) Appl. No.: 11/458,919

(22) Filed: Jul. 20, 2006

(65) Prior Publication Data

US 2006/0285451 A1 Dec. 21, 2006

Related U.S. Application Data

(62) Division of application No. 10/428,929, filed on May 5, 2003, now Pat. No. 7,177,245.

(30) Foreign Application Priority Data

Jul. 31, 2002 (KR) .................. 2002-45139

(51) Int. Cl.
*G11B 7/095* (2006.01)
(52) U.S. Cl. ............... 369/44.41; 369/44.32; 369/53.33; 369/53.28; 369/44.34
(58) Field of Classification Search ............. 369/44.41, 369/44.32, 53.33, 53.26, 44.34
See application file for complete search history.

(56) References Cited

U.S. PATENT DOCUMENTS

| | | | |
|---|---|---|---|
| 6,262,954 B1 * | 7/2001 | Watabe | 369/44.34 |
| 6,266,305 B1 * | 7/2001 | Buchler | 369/44.32 |
| 6,781,932 B2 * | 8/2004 | Beatson | 369/44.41 |
| 6,977,982 B2 * | 12/2005 | Ma et al. | 375/375 |
| 2002/0006091 A1 * | 1/2002 | Ma et al. | 369/44.35 |
| 2002/0018411 A1 * | 2/2002 | Kumagai | 369/47.17 |
| 2003/0202438 A1 * | 10/2003 | Nomoto | 369/44.41 |
| 2004/0151089 A1 * | 8/2004 | Buchler et al. | 369/44.34 |

* cited by examiner

*Primary Examiner*—Wayne Young
*Assistant Examiner*—Linh T. Nguyen
(74) *Attorney, Agent, or Firm*—Sughrue Mion, PLLC (57) ABSTRACT

An apparatus for generating tracking error signals including: an optical detection unit having a plurality of divided light receiving elements to allow beams reflected from a recording surface of the optical disks to be incident; a comparator for outputting after comparing the signals from light receiving elements, which correspond to the set group of the optical detection unit, with the reference signals set for the each group; an error correction unit for correcting and outputting errors if there are any errors after mutual comparison with signals of the groups output from the comparator; a phase-difference detection unit for outputting the signals for each group that correspond to a phase-difference after mutual comparison of the signals of the groups output from the error correction unit; a subtractor for mutually subtracting the signals for each group from the phase-difference detection unit and outputting the tracking error signals.

6 Claims, 6 Drawing Sheets

APPARATUS FOR GENERATING TRACKING ERROR SIGNALS

This is a divisional of application Ser. No. 10/428,929 filed May 5, 2003 now U.S. Pat. No. 7,177,245. The entire disclosure of the prior application, application Ser. No. 10/428,929 is hereby incorporated by reference.

BACKGROUND OF THE INVENTION

1. Field of the Invention

The present invention relates to an apparatus for generating tracking error signals, and more particularly to an apparatus for generating tracking error signals from a reflected and received light from a recording surface of optical disks.

The present application is based on Korean Patent Application No. 2002-45139, filed Jul. 31, 2002, which is incorporated herein by reference in its entirety 2. Background of the Related Art Optical disks, for example, a compact disk(CD) and a digital video disk(DVD), include tracks of spiral shape. Disk players which read out information recorded on these disks emit a light on the optical disks. In order for an optical pickup apparatus, which receives a light reflected from the recording surface, to extract data with no errors, it is necessary to follow tracks with precision. To do this, tracking error signals are generated by using information of optical distribution incident upon a quarterly-divided optical detector which usually receives a light reflected by the recording surface of an optical disk.

For example, optical disk players for DVD generate tracking error signals by using a phase-difference detection method. Korean Patent Laid-Open Publication No. 1998-082277 discloses an apparatus for generating tracking error signals by means of a phase-difference detection method. This apparatus, however, has some problems in that it cannot correct errors of some distortions of the optical detector when a light is received by the optical detector after being reflected from the optical disks. Particularly, when the pit/land length is short, the amplitude of the pick-up signals is very much decreased due to the modulation transfer function(MTF) of the optical pickup, so the effect of noise becomes great. With the MTF, if either the pit/land length gets shorter or the reading speed gets larger, the frequency of the output signals will increase, and as a result, the amplitude of the pick-up signals will decrease. Accordingly, to increase the recording density and speed, it is required to find a method for correcting these signal distortions.

On the other hand, U.S. Pat. No. 6,317,396 B1 discloses an apparatus for generating tracking error signals to reduce problems from these signal distortions. However, an apparatus as suggested in U.S. Pat. No. 6,317,396 B1 uses signals directly from the optical detector and distinguishes errors. Further, its circuit embodiment gets very complicated.

SUMMARY OF THE INVENTION

An object of the invention is to solve at least the above problems and/or disadvantages and to provide an apparatus for generating tracking error signals which can simplify the circuit architecture to correct signal distortion.

To accomplish the object, the apparatus for generating tracking error signals followed by the present invention includes: an optical detection unit equipped with divided light receiving elements to allow beams reflected from a recording surface of the optical disks to be incident; a comparator for outputting comparison signals resulting from comparing the signals from light receiving elements, which correspond to groups of the optical detection unit, with the reference signals set for each group; an error correction unit for correcting and outputting signals, if there are any errors, after mutual comparison with signals of the groups output from the comparator; a phase-difference detection unit for outputting the signals for each group that correspond to a phase-difference after mutual comparison of the signals of the groups output from the error correction unit; a subtractor for outputting tracking error signals by making a mutual subtraction of the signals of the groups output from the phase-difference detection unit.

Desirably, the optical detection unit is a quarterly-divided light receiving element.

In addition, the optical detection unit includes: a first adder for adding up the signals of two light receiving elements disposed in one diagonal direction of the four quarterly-divided light receiving elements, and outputting the added signals to the comparator as the first group signals; a second adder for adding up the signals of two light receiving elements not included in the first group, placed in another diagonal direction of the four quarterly-divided light receiving elements, and outputting the added signals to the comparator as the second group signals.

The comparator includes: a first comparator for comparing the signals of the first adder with reference signals and outputting the results; and a second comparator for comparing the signals of the second adder with reference signals and outputting the results.

The error correction unit includes: a first switching unit for outputting the signals of the first comparator and the first reference signals selectively to the phase-difference detection unit; a second switching unit for outputting the signals of the second comparator and the first reference signals selectively to the phase-difference detection unit; a XOR gate for performing an exclusive logical adding operation of signals of the first and the second comparators; an OR gate for performing a logical adding operation of signals of the first and the second comparators; a pulse comparator for comparing signals of the XOR gate and the OR gate, and controlling the first and second switching units so that the first reference signals are output for those signals corresponding to the same level.

In addition, an apparatus for generating tracking error signals followed by another embodiment of the present invention includes: an optical detection unit equipped with divided light receiving elements to allow beams reflected from the recording surface of optical disks to be incident; a plurality of comparators for outputting comparison signals resulting from comparing the signals from each light receiving element of the optical detection unit with the set reference signals; an error correction unit for determining if there are any errors after mutually comparing the signals of the compared results from the comparators associated with groups of light receiving elements of the optical detection unit oppositely disposed, and thereby correcting and outputting the signals; a phase-difference detection unit for mutually comparing the signals corresponding to each light receiving element from the error correction unit within the associated group, and outputting signals corresponding to the phase-difference respective to each light receiving element; an adder for mutually adding up the signals output from the phase-difference detection unit corresponding to light receiving elements placed in the diagonal direction of the optical detection unit; a subtractor for outputting tracking error signals by making a mutual subtraction of the signals of the groups output from the adder.

The error correction unit includes: a first error correction unit for comparing the signals from the comparator corresponding to the first and second light receiving elements oppositely disposed of the quarterly-divided light receiving elements applied by the optical detection unit, determining if there are any errors, correcting and outputting signals; a second error correction unit for comparing the signals from the comparator corresponding to third and fourth light receiving elements oppositely disposed of the quarterly-divided light receiving elements applied by the optical detection unit, determining if there are any errors, correcting and outputting signals.

In addition, the phase-difference detection unit includes: a first phase-difference detection unit for comparing the signals corresponding to the first and second light receiving elements output from the error correction unit, outputting the signals corresponding to the phase-difference with respect to the first and second light receiving elements; a second phase-difference detection unit for comparing the signals corresponding to the third and fourth light receiving elements output from the error correction unit, outputting the signals corresponding to the phase-difference with respect to the third and fourth light receiving elements; a first OR gate for making a mutual logical adding of the signals output from the first phase-difference detection unit corresponding to the first light receiving element and signals output from the second phase-difference detection unit corresponding to the third light receiving element, and then outputting the result to the subtractor; a second OR gate for making a mutual logical adding of signals output from the first phase-difference detection unit corresponding to the second light receiving element and signals output from the second phase-difference detection unit corresponding to the fourth light receiving element, and then outputting the result to the subtractor.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present an apparatus for generating tracking error signals in accordance with a first preferred embodiment with reference to the accompanying drawings.

Figure 1:
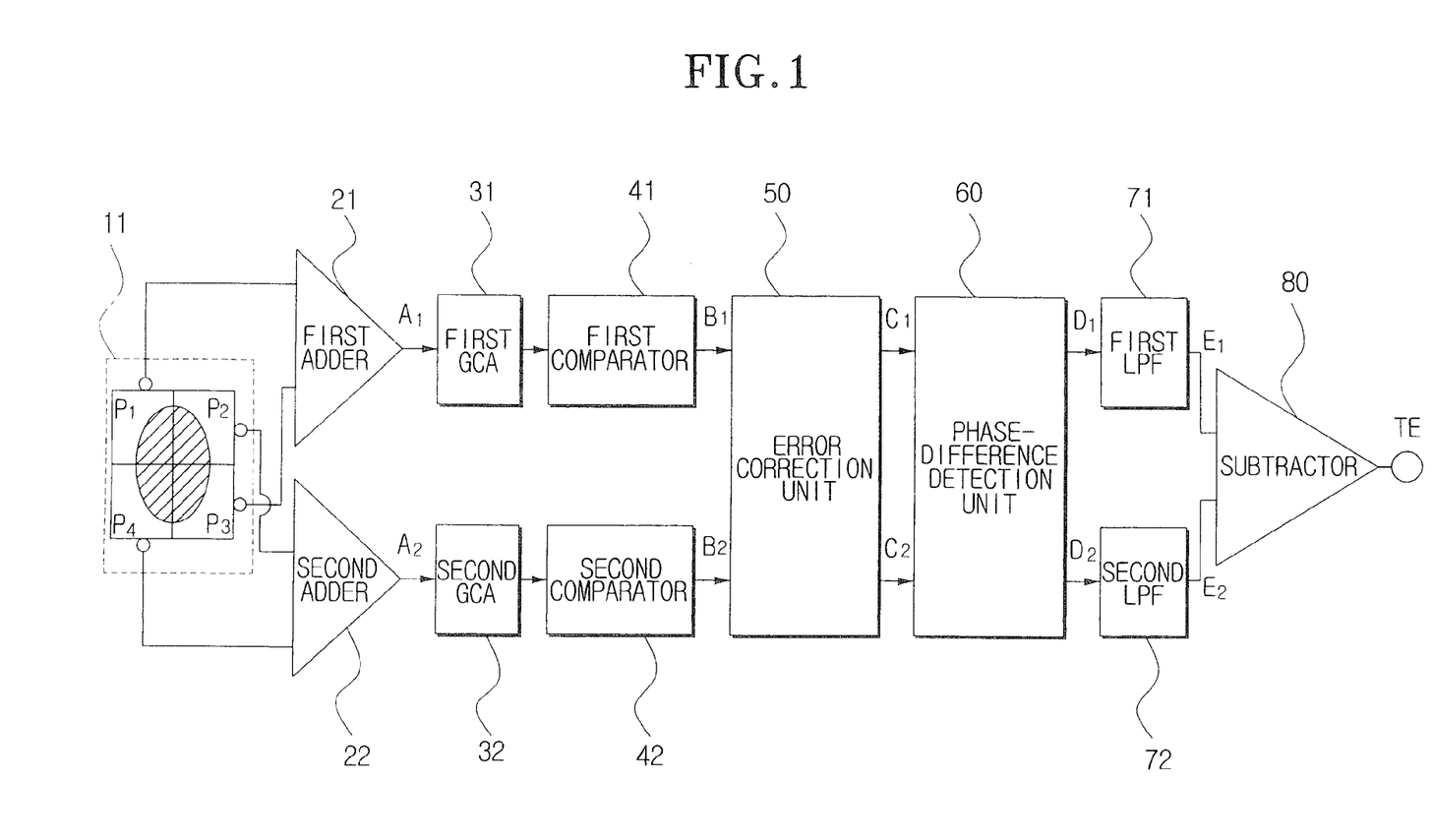
FIG. 1 is a block diagram of an apparatus for generating tracking error signals in accordance with a first preferred embodiment of the present invention.

FIG. 1 is a block diagram of an apparatus for generating tracking error signals in accordance with a first preferred embodiment of the present invention.

Referring to FIG. 1, an apparatus for generating tracking error signals includes first and second adders 21, 22, first and second comparators 41, 42, an error correction unit 50, a phase-difference detection unit 60, and a subtractor 80.

The first adder 21 outputs signals resulting from the mutual adding of the first and third light receiving elements P1, P3, which are placed in one diagonal direction of the quarterly-divided optical detector 11. The signals from the first adder 21 correspond to signals of a first group.

The second adder 22 outputs signals resulting from the mutual adding of the second and fourth light receiving elements P2, P4, which are placed in another diagonal direction of the quarterly-divided optical detector 11. The signals from the second adder 22 correspond to signals of a second group.

A first gain control amplifier 31 controls the output signals from the first adder 21 to a predetermined amplitude.

A second gain control amplifier 32 controls the output signals from the second adder 22 to a predetermined amplitude.

The first comparator 41 outputs signals from the first gain control amplifier 31 as binary signals after comparing them with a reference level.

The second comparator 42 outputs signals from the second gain control amplifier 32 as binary signals after comparing them with a reference level.

An error correction unit 50 compares signals from the first comparator 41 with signals from the second comparator 42, determines if there are any signal distortions, corrects the signals if there are any distortions, and outputs the resulting signals.

A phase-difference detection unit 60 compares signals corresponding to the first group from the error correction unit 50 with signals corresponding to the second group and outputs signals corresponding to the phase-difference by each group.

A first and a second low pass filter 71, 72 convert signals from the phase-difference detection unit 60 into voltage signals proportional to the phase-difference and output the resulting signals.

A subtractor 80 subtracts signals mutually from the first and second low pass filters 71, 72 and outputs the resulting signals as tracking error signals(TES).

When signal distortions occur in the apparatus for generating tracking error signals, an error correction unit 50 will correct them. The diagram of FIG. 2 describes the process in which tracking error signals are generated by disclosing waveforms of each unit.

Figure 2:
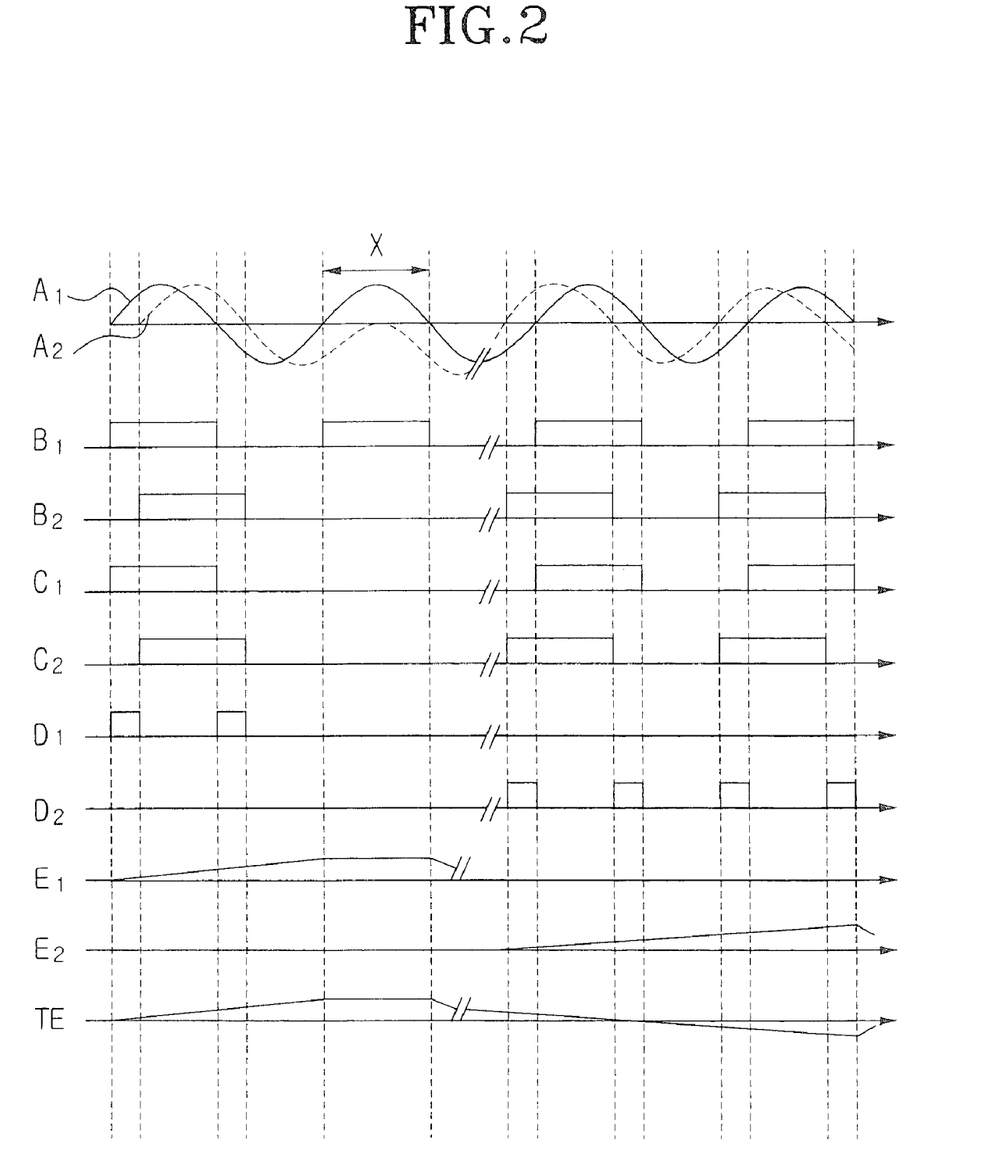
FIG. 2 is a waveform diagram of signals outputted from elements of FIG. 1.
Figure 3:
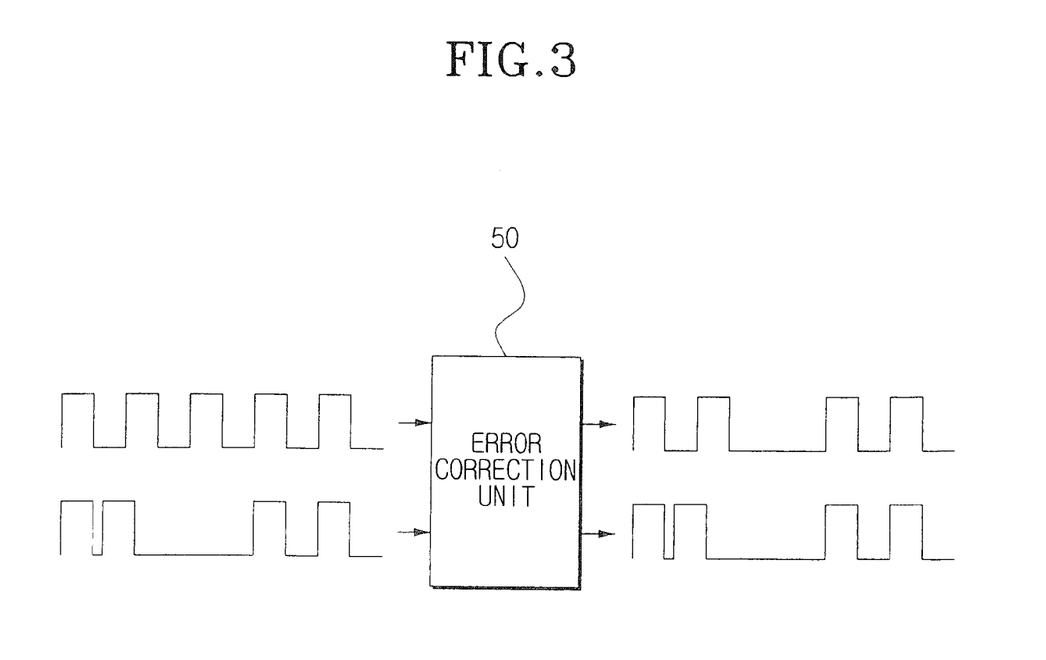
FIG. 3 is a drawing of input and output waveforms of the error correction unit of FIG. 1.

FIG. 2 teaches waveforms A1, A2 from the first and second adders 21, 22, respectively. In addition, the waveform from the second adder 22 illustrates that reduced and abnormal signals are output in the section(X) where signal distortions are assumed to occur.

In this case, the error correction unit 50 decides that the section X, where signals B2 from the second comparator 42 compared to signals B1 from the first comparator 41 maintains a low level for more than a predetermined time, has errors due to signal distortions, and outputs the signal level for the related section after converting them into the same level. As a result, even though signal distortions take place, it is possible to generate normal tracking error signals.

Figure 4:
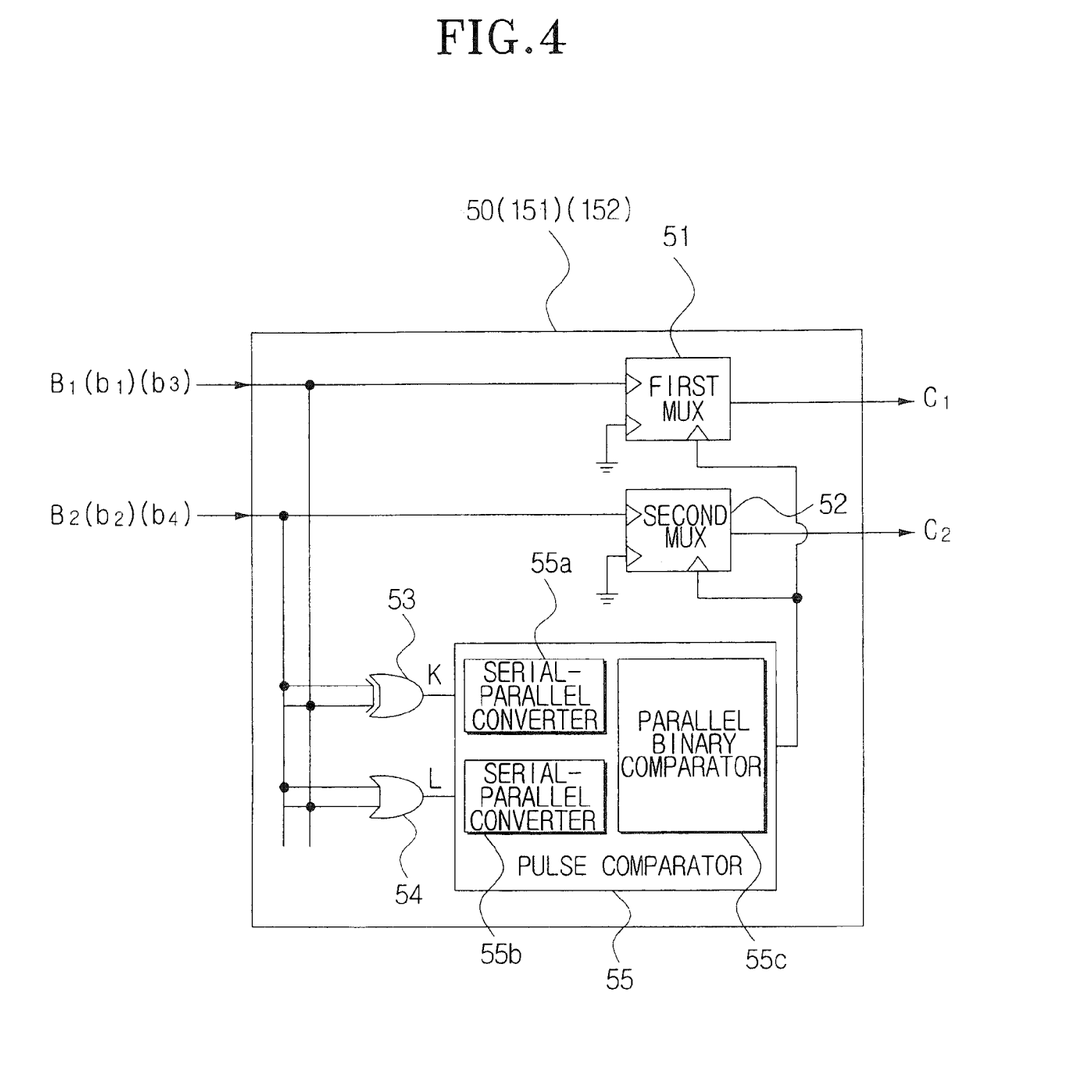
FIG. 4 is a circuit diagram in accordance with a preferred embodiment of the error correction unit in FIG. 1.

A desirable example of this error correction unit 50 is shown in FIG. 4. Also, output waveforms of some of the elements of FIG. 4 are shown in FIG. 5.

Figure 5:
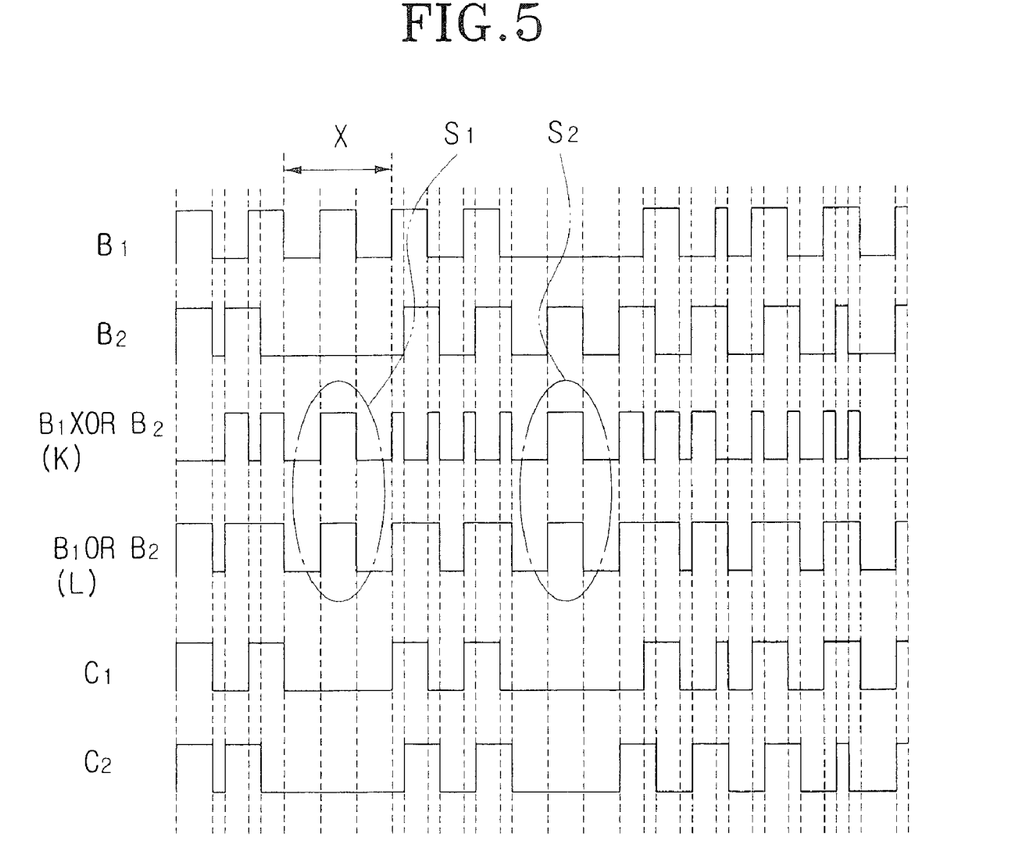
FIG. 5 is a waveform diagram of signals outputted from elements of FIG. 4.

Referring to FIGS. 4 and 5, the error correction unit 50 includes a first MUX 51, a second MUX 52, a XOR gate 53, an OR gate 54, and a pulse comparator 55.

The first and second MUXs 51, 52 output signals in accordance with controlling signals from the pulse comparator 55. Specifically, either signals B1, B2 from the first and second comparator 41, 42 are output unchanged or low signals are output, which are the set first reference signals.

The XOR gate 53 performs an exclusive logical adding operation on the signals B1 from the first comparator 53 and the signals B2 from the second comparator B2, and outputs the results to the pulse comparator 55.

The OR gate 54 performs a logical adding operation on the signals B1 from the first comparator 41 and the signals B2 from the second comparator 42, and outputs the results to the pulse comparator 55.

The pulse comparator 55 compares signals (K) from the XOR gate 53 with signals(L) from the OR gate 54. As a result, when the signals (K) and (L) correspond to the mutually same level, the pulse comparator controls the first MUX 51 and the second MUX 52, which are the first and second switching units, according to the first reference signals. For example, when the signals (K) and (L) correspond to the mutually same level, low signals are output.

The pulse comparator 55 includes two serial-parallel converters 55a, 55b and a parallel comparator 55c.

The serial-parallel converter 55a converts signals (K) from the XOR gate 53 and the serial-parallel converter 55b converts signals(L) from the OR Gate 54, where signals (K) and signals (L) are input in series. A shift register can be applied to the serial-parallel converters 55a, 55b.

A parallel binary comparator 55c compares signals which are made to be parallel in the serial-parallel converter 55a, 55b. In the section where two signals correspond to the same level, the parallel binary comparator 55c outputs signals for controlling MUXs 51, 52 so that the first reference signals are output. In comparing signals, the number of bits compared by the parallel binary comparator 55c corresponds to the number of bits contained in the section X.

According to this error correction unit, if mutual logical adding or exclusive logical adding is performed on the signals from each comparator 41, 42, the signals which have distortions, as illustrated in FIG. 2 and FIG. 5, can be converted into the same waveforms of signals. FIG. 2 and FIG. 5 illustrate waveforms from each unit in FIG. 4 and the section (X), which has signal distortions as seen through sections marked with S1 and S2. So errors can be corrected in the phase-difference detection process later.

Figure 6:
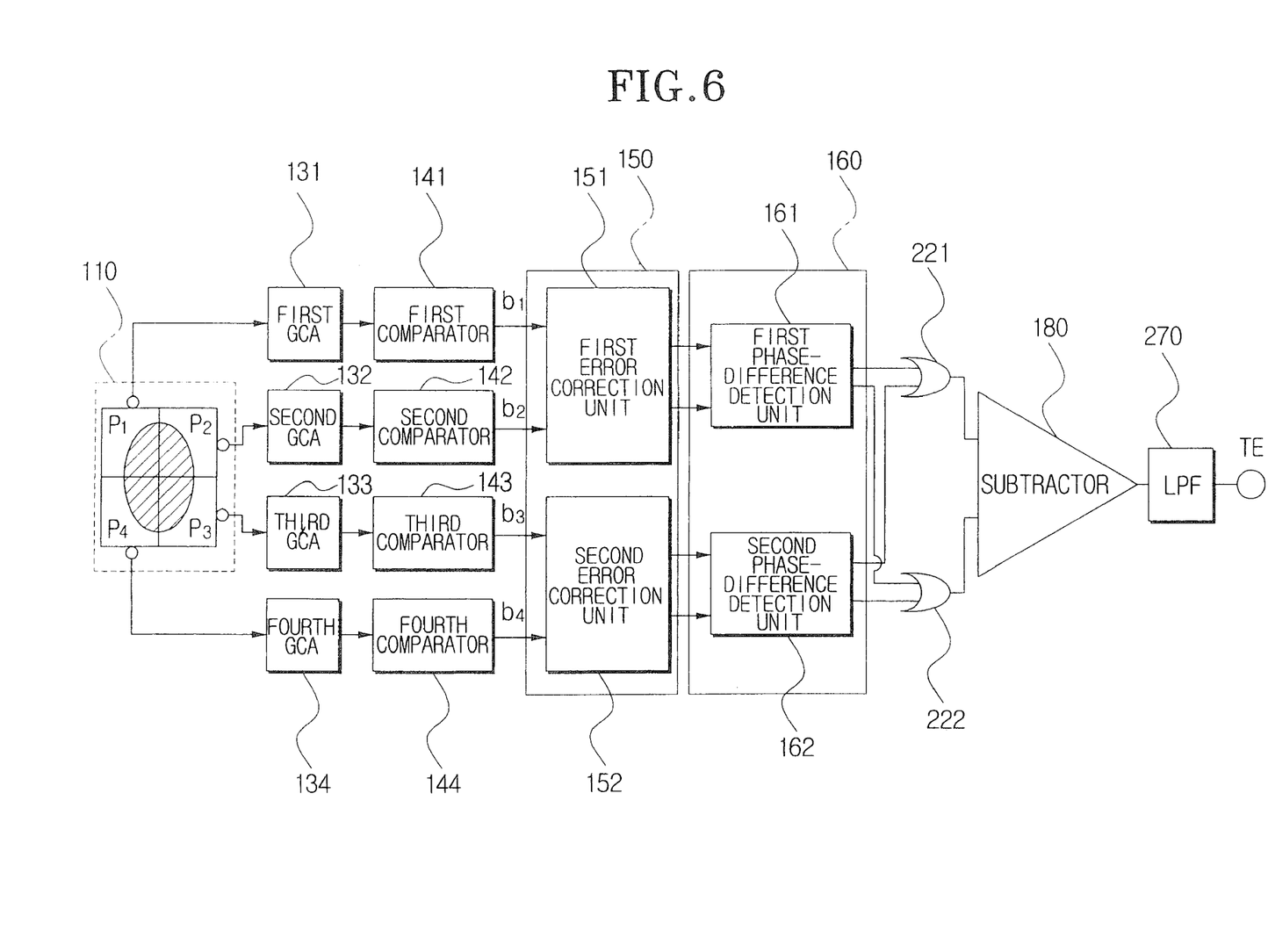
FIG. 6 is a block diagram of an apparatus for generating tracking error signals in accordance with the second preferred embodiment of the present invention.

FIG. 6 illustrates another preferred embodiment where the output signals from light receiving elements of an optical detection unit are grouped. However, the error correction method on signal distortions of the error correction unit 50 is applied in the same way.

Referring to FIG. 6, an apparatus for generating tracking error signals includes first to fourth comparators 141-144, an error correction unit 150, a phase-difference detection unit 160, and a subtractor 180.

In FIG. 6, the first group signal corresponds to signals from the first and second light receiving elements P1, P2 placed closely together on opposite sides in the clockwise direction of the signals from a quarterly-divided optical detector 111, and the second group signal corresponds to signals from the third and fourth light receiving elements P3, P4.

First to fourth gain control amplifiers 131-134 control and output signals from light receiving elements P1 to P4 of the optical detector 111, respectively, in a predetermined amplitude.

The first to fourth comparators 141-144 compare signals from corresponding gain control amplifiers 131-134 with reference levels, and output them as binary signals.

An error correction unit 150 includes a first error correction unit 151 which corrects the first group signal and a second error correction unit 152 which corrects the second group signal.

The first error correction unit 151 corrects and outputs signals from the first light receiving element P1 and the second light receiving element P2 of the optical detector 111 by means of the signal correction method described in FIG. 4.

The second error correction unit 152 corrects and outputs signals from the third light receiving element P3 and the fourth light receiving element P4 of the optical detector 111 by means of the signal correction method described in FIG. 4.

In other words, the same circuit in FIG. 4 is applied to the first error correction unit 151, but the input signals are the signals b1 from the first comparator 141 and the signals b2 from the second comparator 142.

Similarly, the same circuit in FIG. 4 is applied to the second error correction unit 152, but the input signals are the signals b3 from the third comparator 143 and the signals b4 from the fourth comparator 144.

A phase-difference detection unit 160 includes the first phase-difference detection unit 161 which processes the signals of the first group and the second phase-difference detection unit 162 which processes the signals of the second group.

The first phase-difference detection unit 161 compares signals corresponding to the first light receiving element P1 and second light receiving element P2 which are output from the first error correction unit 151, and outputs each signal corresponding to the phase-difference to correspond to each light receiving element.

The second phase-difference detection unit 162 compares signals corresponding to the third light receiving element P3 and fourth light receiving element P4 which are output from the second error correction unit 152, and outputs each signal corresponding to the phase-difference to correspond to each light receiving element.

A first OR gate 221 performs a mutual logical adding of the signals from the first phase-difference detection unit 161 corresponding to the first light receiving element P1 and the signals from the second phase-difference detection unit 162 corresponding to the third light receiving element P3, and outputs the result into a subtractor 180.

A second OR gate 222 performs a mutual logical adding of the signals from the first phase-difference detection unit 161 corresponding to the second light receiving element P2 and the signals from the second phase-difference detection unit 162 corresponding to the fourth light receiving element P4, and outputs the result into the subtractor 180.

A subtractor 180 performs a mutual subtraction of the signals from the first OR gate 221 and signals from the second OR gate 222, and outputs the resulting signals.

Signals from the subtractor 180 go through a low pass filter(LPF) 270 and are output as tracking error signals (TES).

While the invention has been shown and described with reference to certain preferred embodiments thereof, it will be understood by those skilled in the art that various changes in form and details may be made therein without departing from the spirit and scope of the invention as defined by the appended claims. For example, while the invention has been described in the specific content of an apparatus for generating tracking error signals, it has an advantage that it has simple circuit construction as it is made to perform a correction of signal distortions by using signals from comparators which convert signals from light receiving elements into binary signals.

The embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for generating tracking error signals, comprising:
   an optical detection unit, having a plurality of divided light receiving elements, for receiving the beams reflected from the recording surface of optical disks;
   a plurality of comparators for comparing the signals from each light receiving element of the optical detection unit with set reference signals and outputting the signals;
   an error correction unit for mutually comparing a group of signals, the group of signals including the signals of the compared results from the comparators associated with the light receiving elements of the optical detection unit that are oppositely disposed, determining if there are any errors in the group of signals, and outputting the group of signals after correcting the group of signals;
   a phase-difference detection unit for mutually comparing the signals corresponding to each light receiving element from the error correction unit within the associated group of signals, and outputting the signals as the phase-difference to correspond to each light receiving element;
   an adder for mutually adding up the signals output from the phase-difference detection unit that correspond to light receiving elements disposed in the diagonal direction of the optical detection unit;
   a subtractor for mutually subtracting the signals from the adder and outputting the subtraction result as the tracking error signals.

2. The apparatus according to claim 1, wherein an optical detection unit includes quarterly-divided light receiving elements.

3. The apparatus according to claim 2, wherein an error correction unit comprises:
   a first error correction unit for mutually comparing a first group of signals, the first group of signals including the signals from the comparator corresponding to the first and second light receiving elements oppositely disposed of the quarterly-divided light receiving elements, determining if there are any errors in the first group of signals, and outputting the first group of signals after correcting the errors in the first group of signals; and
   a second error correction unit for mutually comparing a second group of signals, the second group of signals including the signals from the comparator corresponding to the third and fourth light receiving elements oppositely disposed of the quarterly-divided light receiving elements, determining if there are any errors in the second group of signals, and outputting the second group of signals after correcting the second group of signals.

4. The apparatus according to claim 3, wherein the phase-difference detection unit comprises:
   a first phase-difference detection unit for mutually comparing the signals corresponding to the first and second light receiving elements from the first error correction unit and outputting signals as the phase-difference to correspond to the first and second light receiving elements;
   a second phase-difference detection unit for mutually comparing the signals corresponding to the third and fourth light receiving elements from the second error correction unit and outputting the signals as the phase-difference to correspond to the third and fourth light receiving elements;
   a first OR gate for performing a mutual logical adding of the signals output from the first phase-difference detection unit corresponding to the first light receiving element and signals output from the second phase-difference detection unit corresponding to the third light receiving element, and then outputting the first OR result to the subtractor
   a second OR gate for performing a mutual logical adding of the signals output from the first phase-difference detection unit corresponding to the second light receiving element and the signals output from the second phase-difference detection unit corresponding to the fourth light receiving element and then outputting the second OR result to the subtractor.

5. The apparatus according to claim 3, wherein the first error correction unit comprises:
   a first switching unit for outputting the signals of the comparator connected with the first light receiving element and the set first reference signals selectively to the phase-difference detection unit;
   a second switching unit for outputting the signals of the comparator connected with the second light receiving element and the set first reference signals selectively to the phase-difference detection unit;
   a XOR gate for performing an exclusive logical adding operation of the signals from the comparator connected with the first light receiving element and signals from the comparator connected with the second light receiving element;
   an OR gate for performing a logical adding operation of the signals of the comparator connected with the first light receiving element and signals from the comparator connected with the second light receiving element; and
   a pulse comparator for comparing the signals from the XOR gate with the signals from the OR gate, and for corresponding sections of the compared signals having the same level, controlling the first and second switching units so that the set first reference signals are outputted.

6. The apparatus according to claim 3, wherein the second error correction unit comprises:
   a third switching unit for outputting the signals from the comparator connected with the third light receiving element and the signals from the set first reference signals selectively to the phase-difference detection unit;

a fourth switching unit for outputting the signals from the comparator connected with the fourth light receiving element and the signals from the set first reference signals selectively to the phase-difference detection unit;

a XOR gate for performing an exclusive logical adding operation of the signals from the comparator connected with the third light receiving elements and the signals from the comparator connected with the fourth light receiving elements;

an OR gate for performing a logical adding operation of the signals from the comparator connected with the third light receiving elements and the signals from the comparator connected with the fourth light receiving elements; and a pulse comparator for comparing the signals from the XOR gate with the signals from the OR gate, and for corresponding sections of the compared signals having the same level, controlling the first and second switching units so that the set first reference signals are outputted.

* * * * *